United States Patent
Chuang

(10) Patent No.: US 8,897,815 B2
(45) Date of Patent: Nov. 25, 2014

(54) METHOD OF OPERATING USER EQUIPMENT FOR PROVIDING MEASUREMENT REPORT IN UMTS

(71) Applicant: Acer Incorporated, New Taipei (TW)

(72) Inventor: Ming-Dao Chuang, New Taipei (TW)

(73) Assignee: Acer Incorporated, Xizhi Dist., New Taipei (TW)

(*) Notice: Subject to any disclaimer, the term of this patent is extended or adjusted under 35 U.S.C. 154(b) by 34 days.

(21) Appl. No.: 13/783,375

(22) Filed: Mar. 3, 2013

(65) Prior Publication Data

US 2014/0073364 A1    Mar. 13, 2014

Related U.S. Application Data

(60) Provisional application No. 61/699,303, filed on Sep. 11, 2012.

(51) Int. Cl.
*H04W 24/00*    (2009.01)
*H04W 24/10*    (2009.01)
*H04W 16/18*    (2009.01)

(52) U.S. Cl.
CPC .............. *H04W 24/10* (2013.01); *H04W 16/18* (2013.01)
USPC ............. 455/456.6; 455/423; 455/67.11; 455/452.2

(58) Field of Classification Search
CPC ..... H04W 24/10; H04W 24/08; H04W 24/02; H04W 24/00; H04B 17/0042
USPC ................. 455/426, 69, 67.11–67.16, 115.1, 455/456.1–457, 422.1–425, 450–453
See application file for complete search history.

(56) References Cited

U.S. PATENT DOCUMENTS

| 8,340,659 | B2* | 12/2012 | Yi et al. ............... 455/425 |
| 8,400,949 | B2* | 3/2013 | Callender et al. ......... 370/278 |
| 8,526,937 | B2* | 9/2013 | Wu ................... 455/422.1 |

(Continued)

FOREIGN PATENT DOCUMENTS

| JP | 2011238990 A | 11/2011 |
| JP | 2013542678 A | 11/2013 |
| WO | 2009048088 A1 | 4/2009 |
| WO | 2012046999 | 4/2012 |

OTHER PUBLICATIONS

3GPP TS 37.320 V11.0.0, Jun. 2012, Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11), pp. 1-20.

(Continued)

*Primary Examiner* — Sharad Rampuria
(74) *Attorney, Agent, or Firm* — Winston Hsu; Scott Margo

(57) ABSTRACT

In a universal mobile telecommunications system, a radio access network includes multiple base stations for communicating with user equipment. The radio access network is configured to send the user equipment a measurement control message which includes configuration information and a location reporting indicator. The user equipment is configured to perform a minimization of drive test according to the configuration information, and provide location information along with the recorded measurement result according to the location reporting indicator.

6 Claims, 2 Drawing Sheets

| | | Embodiment 1 | | Embodiment 2 | | Embodiment 3 | Embodiment 4 | Embodiment 5 |
|---|---|---|---|---|---|---|---|---|
| MEASUREMENT CONTROL message | MDT Configuration | All measurements | All measurements | All measurements | All measurements | All measurements | intra-frequency inter-frequency inter-RAT | All measurements |
| | Location Reporting Indicator | 1 | 0 | 1 | 0 | 1110000 | 100 | 110000000 100000 1000 00 0 0000000 0000 |
| UE Action | Measurement Report only | | 1A~11 2A~2F 3A~3D 4A~4B 5A 6A~6G 7A~7D | 4A~4B 5A 6A~6G 7A~7D | | 1A~11 2A~2F 3A~3D 4A~4B 5A 6A~6G 7A~7D | 4A~4B 5A 6A~6G 7A~7D | 2A~2F 3A~3D | 1C~11 2B~2F 3B~3D 4A~4B 5A 6A~6G 7A~7D |
| | Measuremnet report and location information | 1A~11 2A~2F 3A~3D 4A~4B 5A 6A~6G 7A~7D | | 1A~11 2A~2F 3A~3D | | 1A~11 2A~2F 3A~3D | 1A~11 | 1A 1B 2A 3A |

(56) References Cited

U.S. PATENT DOCUMENTS

| | | | |
|---|---|---|---|
| 8,577,360 B2* | 11/2013 | Olsson | 455/423 |
| 8,768,335 B2* | 7/2014 | Yi et al. | 455/422.1 |
| 2013/0040634 A1* | 2/2013 | Johansson et al. | 455/422.1 |
| 2013/0137379 A1* | 5/2013 | Jung et al. | 455/67.11 |
| 2013/0279342 A1* | 10/2013 | Chuang | 370/241 |

OTHER PUBLICATIONS

NTT Docomo, Inc., CMCC, TeliaSonera, Deutsche Telekom, "Location Information in event Ax, Bx measurement report for Immediate MDT", 3GPP TSG-RAN2#79, R2-123707, Aug. 13-17, 2012, pp. 1-3, Qingdao, China.

* cited by examiner

| | | Embodiment 1 | Embodiment 1 | Embodiment 2 | Embodiment 2 | Embodiment 3 | Embodiment 4 | Embodiment 5 |
|---|---|---|---|---|---|---|---|---|
| MEASUREMENT CONTROL message | MDT Configuration | All measurements | All measurements | All measurements | All measurements | All measurements | intra-frequency inter-frequency inter-RAT | All measurements |
| MEASUREMENT CONTROL message | Location Reporting Indicator | 1 | 0 | 1 | 0 | 1110000 | 100 | 110000000 100000 1000 00 0 0000000 0000 |
| UE Action | Measurement Report only | 1A~1I 2A~2F 3A~3D 4A~4B 5A 6A~6G 7A~7D | 1A~1I 2A~2F 3A~3D 4A~4B 5A 6A~6G 7A~7D | 4A~4B 5A 6A~6G 7A~7D | 1A~1I 2A~2F 3A~3D 4A~4B 5A 6A~6G 7A~7D | 4A~4B 5A 6A~6G 7A~7D | 2A~2F 3A~3D | 1C~1I 2B~2F 3B~3D 4A~4B 5A 6A~6G 7A~7D |
| UE Action | Measuremnet report and location information | 1A~1I 2A~2F 3A~3D 4A~4B 5A 6A~6G 7A~7D | ✕ | 1A~1I 2A~2F 3A~3D | ✕ | 1A~1I 2A~2F 3A~3D | 1A~1I | 1A 1B 2A 3A |

FIG. 2

METHOD OF OPERATING USER EQUIPMENT FOR PROVIDING MEASUREMENT REPORT IN UMTS

CROSS REFERENCE TO RELATED APPLICATIONS

This application claims the benefit of U.S. provisional application No. 61/699,303 filed on Sep. 11, 2012.

BACKGROUND OF THE INVENTION

1. Field of the Invention

The present invention is related to a method of operating a user equipment, and more particularly to a method of operating a user equipment for providing a measurement report in a UMTS.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple base stations (Node-B, NB) for communicating with multiple mobile stations (user equipment, UE).

NBs of the wireless communication system must be deployed properly in order to provide seamless, high quality and large signal coverage without experiencing call drops or signal degradation. However, planning and optimizing the deployment of the NBs are based on signal quality measurements which may be time- and effort-consuming for an operator of the wireless communication system. Common methods of performing the measurements include measuring the signal strength or quality at different time and geographical locations of interest. Therefore, it is more economical for a UE of the wireless communication system to perform the measurements and send the measurement report to an NB. Based on the measurement reports received from multiple UEs, the deployment of the NBs may be planned and optimized accordingly without spending many human and material resources.

In a minimization of drive test (MDT) proposed in current 3GPP specifications associated with UMTS (such as 3GPP TS 25.331), the UE is configured to measure radio channels and report the radio channel measurement information to the NB periodically at an interval, immediately in response to a specific event, or after a predetermined time has elapsed from the time when the radio channel measurement information has been recorded. The UE sends the measurement report after the completion of channel measurement. The NB may then use the MDT measurement report received from the UE for coverage optimization, mobility optimization, capacity optimization and Quality of Service (QoS) verification. Therefore, there is a need to improve the efficiency of the NB when performing the above-mentioned optimizations or verifications.

SUMMARY OF THE INVENTION

The present invention provides a method of operating a user equipment for providing a measurement report in a UMTS. The method includes receiving a measurement control message having a configuration information and a location reporting indicator; performing an MDT according to the configuration information and recording MDT data; providing a first measurement report associated with a first reporting event indicated by the configuration information when the first reporting event is satisfied; and providing a first location information along with the first measurement report when the first reporting event is selected in the location reporting indicator.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is diagram illustrating the operation of a user equipment in UMTS according embodiments of the present inventions.

DETAILED DESCRIPTION

Figure 1:
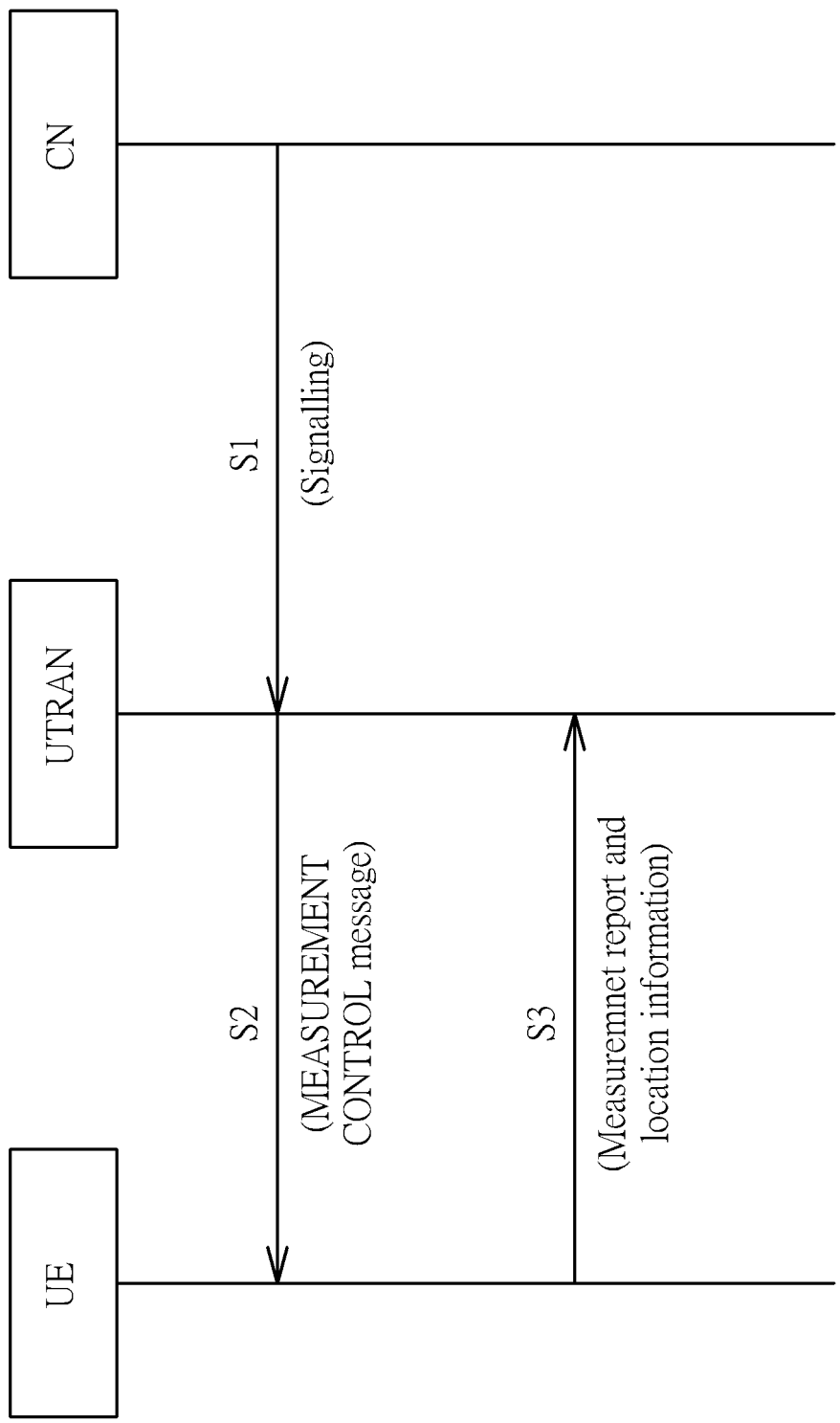
FIG. 1 is a signaling diagram illustrating a method of providing measurement reports along with location information in UMTS according to an embodiment of the present invention.

FIG. 1 is a signaling diagram illustrating a method of providing measurement reports along with location information in UMTS according to an embodiment of the present invention.

The UMTS includes a user equipment UE, a core network CN, and a UTRAN. The core network CN is divided in circuit switched and packet switched domains (not shown in FIG. 1). Circuit switched elements may include MSC (Mobile services Switching Center), VLR (Visitor location register) and Gateway MSC. Packet switched elements may include SGSN (Serving GPRS Support Node) and GGSN (Gateway GPRS Support Node). Some network elements, like EIR (Equipment identity register), HLR (Home Location Register), VLR and AUC (Authentication Center) are shared by both domains. In step S1, MDT types, list of measurements and reporting trigger information are signaled from the core network CN to the UTRAN.

The UTRAN allows connectivity between the UE and the core network CN. In step S2, the UTRAN controls the measurement-related configuration of the UE by way of a MEASUREMENT CONTROL message that is sent from the RRC (Radio Resource Control) of the UTRAN to the peer entity RRC on the UE. The MEASUREMENT CONTROL message may include MDT configuration information (measurement types, absolute reference time, sampling cycle, or measurement duration) and a location reporting indicator.

In the RRC protocol specifications included in current 3GPP specifications associated with UMTS (such as 3GPP TS 25.331), UE measurements in UMTS can be categorized into seven types: intra-frequency measurements, inter-frequency measurements, inter-RAT measurements, traffic volume measurements, quality measurements, UE internal measurements, and UE positioning measurements.

Intra-frequency measurement includes 9 reporting events defined as follows:
  Event 1A: a primary CPICH enters the reporting range;
  Event 1B: a primary CPICH leaves the reporting range;
  Event 1C: a non-active primary CCPCH becomes better than an active primary CCPCH;
  Event 1D: change of best cell;
  Event 1E: a primary CCPCH becomes better than an absolute threshold; and Event 1F: a primary CCPCH becomes worse than an absolute threshold;

Event 1G: change of best cell;

Event 1H: timeslot ISCP below a certain threshold;

Event 1I: timeslot ISCP above a certain threshold.

Inter-frequency measurement includes 6 reporting events defined as follows:

Event 2A: change of best frequency;

Event 2B: the estimated quality of the currently used frequency is below a certain threshold and the estimated quality of a non-used frequency is above a certain threshold;

Event 2C: the estimated quality of a non-used frequency is above a certain threshold;

Event 2D: the estimated quality of the currently used frequency is below a certain threshold;

Event 2E: the estimated quality of a non-used frequency is below a certain threshold; and Event 2F: the estimated quality of the currently used frequency is above a certain threshold.

Inter-RAT measurement includes 4 reporting events defined as follows:

Event 3A: the estimated quality of the currently used UTRAN frequency is below a certain threshold and the estimated quality of the other system is above a certain threshold;

Event 3B: the estimated quality of other system is below a certain threshold;

Event 3C: the estimated quality of other system is above a certain threshold.

Event 3D: change of best cell in other system

Traffic volume measurement includes 2 reporting events defined as follows:

Event 4A: transport channel traffic volume exceeds an absolute threshold; and

Event 4B: transport channel traffic volume becomes smaller than an absolute threshold.

Quality measurement includes 1 reporting event defined as follows:

Event 5A: a predefined number of bad cycle redundancy checks (CRCs) is exceeded.

UE internal measurement includes 7 reporting events defined as follows:

Event 6A: the UE transmitting power becomes larger than an absolute threshold;

Event 6B: the UE transmitting power becomes less than an absolute threshold;

Event 6C: the UE transmitting power reaches its minimum value;

Event 6D: the UE transmitting power reaches its maximum value;

Event 6E: the UE received signal strength indicator (RSSI) reaches the UE's dynamic receiver range;

Event 6F: the UE receiving-transmitting time difference becomes larger than an absolute threshold; and Event 6G: the UE receiving-transmitting time difference becomes smaller than an absolute threshold.

UE positioning measurement includes 7 reporting events defined as follows:

Event 7A: the UE position changes more than an absolute threshold;

Event 7B: SFN-SFN (single frequency network) measurement changes more than an absolute threshold;

Event 7c: GPS (global positioning system) time and SFN time have drifted apart more than an absolute threshold.

In step S3, the UE is configured to perform MDT, record MDT measurement result, provide measurement reports according to the MEASUREMENT CONTROL message, and provide location information along with the recorded MDT measurement result according to the location reporting indicator.

FIG. 2 is diagram illustrating the operation of the UE in response to the MEASUREMENT CONTROL message according embodiments of the present inventions.

The MDT configuration information in the MEASUREMENT CONTROL message may be used for instructing the UE to send measurement reports when one or multiple of the aforementioned reporting events are satisfied. For example, the MDT configuration may be set to indicate all types of measurements, as shown in Embodiments 1-3 and 5. In other words, when any of the reporting events 1A~1I, 2A~2F, 3A~3D, 4A~4B, 5A, 6A~6G and 7A~7D is satisfied, the UE is configured to send the corresponding measurement report to the UTRAN in step S3. The MDT configuration may also be set to indicate certain types of measurements only, such as intra-frequency measurement, inter-frequency measurement and inter-RAT measurement in Embodiment 4. In other words, when any of the reporting events 1A~1I, 2A~2F and 3A~3D is satisfied, the UE is configured to send the corresponding measurement report to the UTRAN in step S3.

The location reporting indicator in the MEASUREMENT CONTROL message may be set to select one or multiple of the afore-mentioned reporting events.

In Embodiment 1, the location reporting indicator includes a single bit which may be set to logic high/low for selecting/deselecting all reporting events. For example, when the location reporting indicator is set to 1, the UE is configured to send a measurement report along with location information to the UTRAN when any of the reporting events 1A~1I, 2A~2F, 3A~3D, 4A~4B, 5A, 6A~6G and 7A~7D is satisfied; when the location reporting indicator is set to 0, the UE is configured to send a measurement report without location information to the UTRAN when any of the reporting events 1A~1I, 2A~2F, 3A~3D, 4A~4B, 5A, 6A~6G and 7A~7D is satisfied.

In Embodiment 2, the location reporting indicator includes a single bit which may be set to logic high/low for selecting/deselecting certain types of reporting events. If intra-frequency measurement, inter-frequency measurement and inter-RAT measurement are considered to be more important than other measurement for an application, the location reporting indicator may be set to select/deselect these 3 types of reporting events. For example, when the location reporting indicator is set to 1, the UE is configured to send a measurement report along with location information to the UTRAN when any of the reporting events 1A~1I, 2A~2F and 3A~3D is satisfied, and send a measurement report without location information to the UTRAN when any of the reporting events 4A~4B, 5A, 6A~6G and 7A~7D is satisfied; when the location reporting indicator is set to 1, the UE is configured to send a measurement report without location information to the UTRAN when any of the reporting events 1A~1I, 2A~2F, 3A~3D 4A~4B, 5A, 6A~6G and 7A~7D is satisfied.

In Embodiment 3, the location reporting indicator may include multiple bits and its length is associated with the number of measurement types. According to current 3GPP specifications, the location reporting indicator may include 7 bits corresponding to intra-frequency measurement, inter-frequency measurement, inter-RAT measurement, traffic volume measurement, quality measurement, UE internal measurement, and UE position measurement, respectively. For example, if the location reporting indicator is set to (1110000) as shown in Embodiment 3, the UE is configured to send a measurement report along with location information to the UTRAN when any of the reporting events 1A~1F, 2A~2F and 3A~3D is satisfied, and send a measurement report without location information to the UTRAN when any of the reporting events 4A~4B, 5A, 6A~6G and 7A~7D is satisfied.

In Embodiment 4, the location reporting indicator may include multiple bits and its length is associated with the number of measurement types indicated by the MDT configuration. If the MDT configuration is set to indicate intra-frequency measurement, inter-frequency measurement and inter-RAT measurement in Embodiment 4, the location reporting indicator may include 3 bits corresponding to intra-frequency measurement, inter-frequency measurement and inter-RAT measurement, respectively. For example, if the location reporting indicator is set to (100) as shown in Embodiment 4, the UE is configured to send a measurement report along with location information to the UTRAN when any of the reporting events 1A~1F is satisfied, and send a measurement report without location information to the UTRAN when any of the reporting events 2A~2F and 3A~3D is satisfied.

In Embodiment 5, the location reporting indicator may include multiple bits and its length is associated with the number of measurement reporting events. According to current 3GPP specification, the location reporting indicator may be a 33-bit signal. The 33 bits correspond to events 1A~1I, 2A~2F, 3A~3D, 4A~4B, 5A, 6A~6G and 7A~7D, respectively. For example, if the location reporting indicator is set to (110000010000010000000000000000) as shown in Embodiment 5, the UE is configured to send a measurement report with location information to the UTRAN when any of the reporting events 1A, 1B, 2A and 3A is satisfied, and send a measurement report without location information to the UTRAN when any of the reporting events 1C~1I, 2B~2F, 3B~3D, 4A~4B, 5A, 6A~6G and 7A~7D is satisfied.

In the present invention, the location information may be a global positioning system (GPS) information, an assisted global positioning system (AGPS) information, or a global navigation satellite systems (GNSS) information.

The present invention provides a method of operating a UE for providing measurement reports along with location information to an NB of UTRAN in a UMTS. The NB may then perform coverage optimization, mobility optimization, capacity optimization and QoS verification with better efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a user equipment for providing a measurement report to a network in a universal mobile telecommunications system (UMTS), comprising:
   the user equipment receiving a measurement control message having a configuration information and a location reporting indicator from the network;
   the user equipment performing a minimization of drive test (MDT)
   according to the configuration information and recording MDT data; the user equipment providing a first measurement report associated with a first reporting event indicated by the configuration information to the network when the first reporting event is satisfied; and
   the user equipment providing a first location information along with the first measurement report to the network when the first reporting event is selected in the location reporting indicator,
   wherein the first location information is associated with a location of the user equipment when the first reporting event is satisfied;
   wherein the configuration information indicates M reporting event types each having one or multiple reporting events
   the location reporting indicator includes a single bit set to a first value for selecting N reporting event types among the M reporting event types or set to a second value for deselecting the N reporting event types among the M reporting event types; M and N are positive integers; and M is larger or equal to N.

2. The method of claim 1, wherein the location reporting indicator includes a single bit set to a first value for selecting the first reporting event or set to a second value for deselecting the first reporting event.

3. The method of claim 1, wherein:
   the configuration information indicates a plurality of reporting event types each having one or multiple reporting events; and
   the location reporting indicator includes a plurality of bits each associated with a corresponding reporting event type and set to a first value for selecting one or more reporting events of the corresponding reporting event type or set to a second value for deselecting the one or more reporting events of the corresponding reporting event type.

4. The method of claim 1, wherein:
   the configuration information indicates one or multiple reporting events; and
   the location reporting indicator includes one or multiple bits each associated with a corresponding reporting event and set to a first value for selecting the corresponding reporting event or set to a second value for deselecting the corresponding reporting event type.

5. The method of claim 1, wherein:
   the configuration information indicates multiple reporting events; and
   the location reporting indicator includes a single bit set to a first value for selecting the multiple reporting events or set to a second value for deselecting the multiple reporting events.

6. The method of claim 1, further comprising:
   the user equipment providing a second measurement report associated with a second reporting event indicated by the configuration information to the network when the second reporting event is satisfied; and
   the user equipment providing a second location information along with the second measurement report to the network when the second reporting event is selected in the location reporting indicator.

* * * * *